United States Patent Office 3,248,238
Patented Apr. 26, 1966

3,248,238
OPTICAL GLASS
Marga Faulstich, Mainz, Germany, assignor to Jenaer Glaswerk Schott & Gen., Mainz, Germany
No Drawing. Filed Sept. 24, 1962, Ser. No. 225,827
Claims priority, application Germany, Sept. 27, 1961, J 20,582
7 Claims. (Cl. 106—54)

This invention relates to optical glass.

In my copending application, Serial No. 182,715, filed March 22, 1962, and now abandoned, I have described optical glasses having low crystallization tendency, low flaw susceptibility and amenable to continuous production techniques. Among the objects of the present invention are to provide in optical glass and optical glass as is the subject of the aforementioned copending application, further decrease in flaw susceptibility and crystallization tendency, and improved weather resistance, and glasses having very high Abbé ($\nu$) values in relation to refraction. As such relative values can be mentioned Abbé of 60 and index of refraction ($n_d$) of 1.62.

According to the invention, in glass of the type to which the invention relates, the boric acid ($B_2O_3$) can be increased to as much as about 27%; the silicic acid ($SiO_2$) can be decreased to as little as about 24% and the bivalent oxides can be reduced to as little as 38%. These glasses contain lanthanum oxide.

The glass composition can be as follows:

| | Percent |
|---|---|
| $B_2O_3$ | 16–27 |
| $SiO_2$ | 24–32 |
| Bivalent oxides | 38–44 |
| $La_2O_3$ | 3–7 |

As a more preferred range for the lanthanum oxide can be mentioned the range of the aforementioned copending application of 3.3–6.7%.

The barium oxide content of the glass can be 15–40%.

It has been found that with some sacrifice in Abbé, stability, e.g., stability in resistance to crystallization and flaw development or stability in resistance to crystallization or flaw development, can be increased, particularly in heavy crown and heaviest crown glasses by decreasing the BaO content to as little as 15% and about correspondingly increasing the content of other bivalent oxides, the bivalent oxides increased preferably being ZnO, CaO, and MgO. Thus, the BaO can be in the range of 15–40% and the bivalent oxides can be in the range of 0–26% without BaO. These glasses can and preferably do contain about equal quantities of $ZrO_2$ and MgO. The $ZrO_2$ and MgO-containing glass have practically no crystallization tendency. The amount of $ZrO_2$ and MgO, combined can be 6%, and these oxides can be present in equal amounts. Increasing $ZrO_2$ and MgO above the 6% occasions an increase in crystallization tendency. In the case of barium flints, little or no advantage is gained by inclusion of the MgO and for such flints, the $ZrO_2$ can be up to about 4%.

It will be understood that in respect to the amounts of materials mentioned in terms of an upper percentage limit, the lower limit can be a fraction of a percent, or about 1%. In the following table, compositions according to the invention and prior art compositions are set forth, and properties for the various glasses are given.

In the table, glass A is a glass according to application Serial No. 182,715, filed March 22, 1962; glass B is a prior art barium-silicon-borate glass; and glass C is according to the instant invention.

Regarding the units in which properties are reported, the expansion coefficient is given as $\alpha \cdot 10^7$ (25–300° C.); transformation point (Tg) in ° C.; flaw susceptibility (FA) is the maximum destroyed layer thickness in $\mu$ which is formed by the action of standard acetate (pH, 4.6) at room temperature after the indicated corrosion time; weather resistance (Wf) was determined by examination of specimens after exposure for 24 hours in a tropical chamber.

TABLE 1

| Test | O | | I | |
|---|---|---|---|---|
| Oxide | B | C | A | C |
| $B_2O_3$ | 18.0 | 26.9 | 16.3 | 18.8 |
| $SiO_2$ | 31.2 | 24.2 | 31.0 | 30.3 |
| BaO | 49.4 | 40.1 | 44.1 | 16.3 |
| CaO | | | 1.0 | 14.3 |
| ZnO | | | 1.0 | 9.5 |
| $Al_2O_3$ | 1.4 | 1.9 | 1.0 | 1.0 |
| $La_2O_3$ | | 6.0 | 4.1 | 5.8 |
| $TiO_2$ | | | 1.5 | |
| $ZrO_2$ | | | | 2.1 |
| MgO | | | | 1.9 |
| $n_d$ | 1.6204 | 1.6170 | 1.6385 | 1.6381 |
| $\nu_d$ | 60.3 | 60.7 | 55.5 | 55.5 |
| $\alpha \cdot 10^7$ | 78 | 71 | 78 | 74 |
| Tg in ° C | 635 | 634 | 647 | 623 |
| Sp. Wt | 3.61 | 3.48 | 3.62 | 3.32 |
| FA | 0.89 $\mu$/$2^{15}$ hours | 0.19 $\mu$/$2^{15}$ hours | 0.46 $\mu$/1 hour | 0.12 $\mu$/1 hour |
| Wf-corrosion | very strong | very weak | strong | very weak |

In order to prepare a glass having the following composition in parts by weight, for example:

| | |
|---|---|
| $B_2O_3$ | 20.4 |
| $SiO_2$ | 28.0 |
| BaO | 39.5 |
| CaO | 1.0 |
| ZnO | 1.0 |
| $Al_2O_3$ | 1.0 |
| $La_2O_3$ | 4.1 |
| $TiO_2$ | 1.5 | a mixture is smelted from the following ingredients, parts by weight (batch mixture for 150 kg. melt):

| | |
|---|---|
| $H_3BO_3$ | 58.5 |
| $SiO_2$ | 39.0 |
| $Ba(NO_3)_2$ | 102.0 |
| $CaCO_3$ | 2.689 |
| ZnO | 1.525 |
| $Al(OH)_3$ | 2.278 |
| $La_2O_3$ | 6.175 |
| $TiO_2$ | 2.255 |
| $As_2O_3$ | 0.455 |

For optical glasses, as it is known, the purest ironless raw materials are employed. The oxide contents of the cations of each raw material have been analytically determined before use. The batch weighed in is mixed for 7 minutes in a mixer as usual in trade. The well mixed batch is put into a platinum crucible for about 8 to 10 hours at 1,350° C. and subsequently refined for about 2 hours at 1,380° C. in a normal atmosphere. If the glass samples taken during the refining process are not bubble-free, the refining time can be extended. As refining agents, one can use, besides $As_2O_3$, also $Sb_2O_3$ or NaCl.

After having been refined, the melt is homogenized by putting a stirrer into it and agitating it for 1 to 1½ hours at a speed of about 100 revolutions per minute. At the same time, heating is reduced, so that the melt is cooled down to 1,000° C. within 1 to 1½ hours. Then the melt is poured into an iron mold preheated to about 300° C., in the shape of large ingots or bars. The filled mold is then slid into a lehr, the temperature of which decreases from 647° C. at a rate of 10° per hour, until it reaches normal room temperature. The primary purpose of this "pre-cooling" is to prevent cracks from forming already during the cooling process or bursting from occurring in consequence of freezing of mechanical stresses during subsequent sawing or grinding. After complete cooling, the pieces of glass are taken out of the lehr and can be given the shape required for subsequent processing, if necessary, by sawing, breaking, grinding, etc. Furthermore, the pieces can be examined with regard to their quality, e.g., bubbles, striae, refraction of light, etc.

The glass obtained according to the foregoing description is designated as "optical raw glass." Herewith it is expressed that its peculiarity consists in attaining specially remarkable refraction and dispersion properties, which are of particular importance for optical purposes. On the other hand, the designation "raw glass" tells that this glass need not be exposed to a special fine-cooling process or be available in large and completely homogeneous pieces.

Obviously, the homogeneity requirements for an optical glass depend largely on the intended use, and there may, e.g., exist a glass with an excellent suitability for a microscope lens, which is, however, completely unfit for large-sized optical pieces, owing to its inhomogeneity.

Thus, the patent application refers only to the making of optical raw glass. It rests, of course, absolutely with the producer to proceed at any moment or not to a refining treatment, e.g., a fine annealing, a shaping through hot-pressing, etc. This applies also to such modifications of the manufacturing process against the described one in which the pre-cooling operation is already effected as a fine annealing or in which the glass is molded still in the liquid state or in which the glass is manufactured in a continuous melting process out of the tank. Accordingly, the patent application must by no means be limited to a determined process, but it has to refer to the chemical composition of a glass substance with a specially remarkable stability to crystallization and with a chemical constancy. The delineated process, inclusive of the special example, has merely to describe a method being at the present time conventional, absolutely reliable, and not excessively expensive, by which a glass may be obtained which is suitable for the manufacture of lenses up to a diameter of 20 mm.

Percentages herein are on a weight basis, unless otherwise indicated.

What is claimed is:
1. An optical glass characterized by low crystallization tendency and low flaw susceptibility consisting essentially of the following ingredients in about the proportions set forth:

| | Percent |
|---|---|
| $B_2O_3$ | 16–27 |
| $SiO_2$ | 24–32 |
| Bivalent oxides | 38–44 |
| $La_2O_3$ | 3–7 | said bivalent oxides being selected from the group consisting of BaO, ZnO, CaO, and MgO, the BaO being 15–40% of the glass and the ZnO, CaO, and MgO being up to 26% of the composition.

2. Composition according to claim 1 wherein the glass contains $ZrO_2$ and MgO, the total of $ZrO_2$ and MgO being up to about 6%.

3. Composition according to claim 2, wherein the amounts of $ZrO_2$ and MgO are about equal.

4. Composition according to claim 1, and containing $ZrO_2$ in amounts up to 4%.

5. Composition according to claim 1, and containing $ZrO_2$ in amounts up to 4%.

6. Barium borosilicate crown glass containing $La_2O_3$ having a refractive index ($n_d$) of about 1.6170 and an Abbé value ($\nu_d$) of about 60.7 and consisting of the following composition in percent by weight:

| | Percent |
|---|---|
| $B_2O_3$ | 26.9 |
| $SiO_2$ | 24.2 |
| BaO | 40.1 |
| $Al_2O_3$ | 1.9 |
| $La_2O_3$ | 6.0 |

7. Barium borosilicate crown glass containing $La_2O_3$ having a refractive index ($n_d$) of about 1.6381 and an Abbé value ($\nu_d$) of about 55.5, and consisting of the following composition in percent by weight:

| | Percent |
|---|---|
| $B_2O_3$ | 18.8 |
| $SiO_2$ | 30.3 |
| BaO | 16.3 |
| CaO | 14.3 |
| ZnO | 9.5 |
| $Al_2O_3$ | 1.0 |
| $La_2O_3$ | 5.8 |
| $ZrO_2$ | 2.1 |
| MgO | 1.9 |

References Cited by the Examiner

UNITED STATES PATENTS

| 2,523,362 | 9/1950 | Fraser et al. | 106—54 |
| 2,584,974 | 2/1952 | Armistead | 106—54 |
| 2,702,749 | 2/1955 | Hafner et al. | 106—53 |

TOBIAS E. LEVOW, *Primary Examiner.*